2,833,665

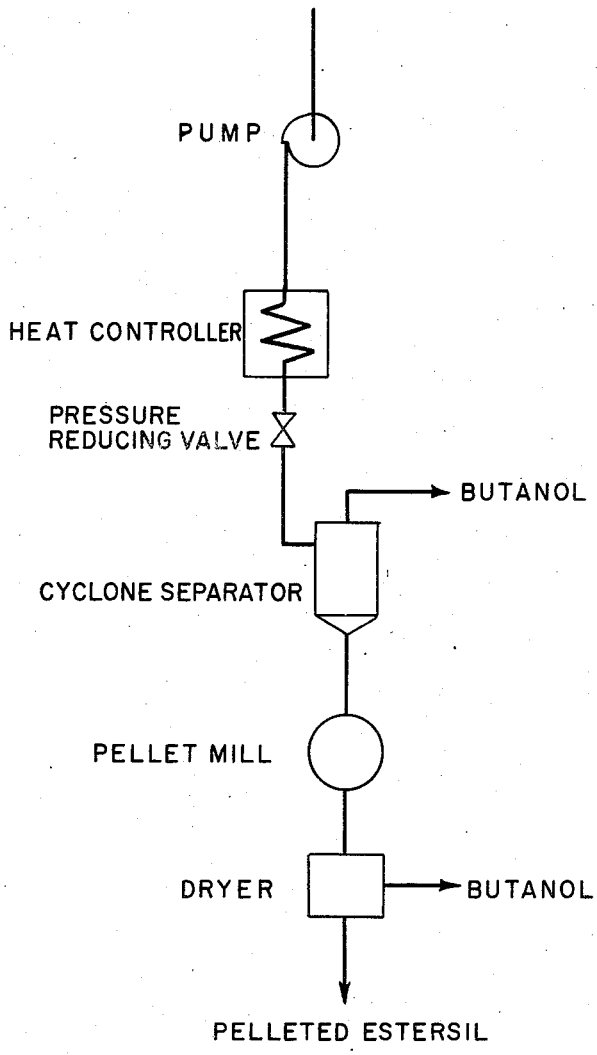

SHAPED BODY OF POROUS SILICA PARTICLES AND METHOD FOR ITS PRODUCTION

Roger E. Drexel and John R. McWhorter, Wilmington, Del., assignors to E. I. du Pont de Nemours and Company, Wilmington, Del., a corporation of Delaware Application July 23, 1953, Serial No. 369,889

7 Claims. (Cl. 106—308)

This invention relates to processes for making particulate, porous, inorganic solids of high surface area which are in easily dispersible, yet densified, form and to the products produced by compacting the densified solids into formed bodies. The invention is directed more particularly to such processes wherein a fluid mixture of an organic liquid and a particulate, porous solid having an inorganic internal structure with a specific surface area of at least 25 m.$^2$/g. is heated under pressure and then the pressure is reduced to remove most of the liquid. The temperature of the fluid mixture and the conditions under which pressure is released are so selected that some of the liquid is left in the particulate solid but no great excess remains over that which is present in a free-flowing and apparently dry product. The invention further relates to the novel products produced by compacting the apparently dry material into formed bodies such as pellets, without the use of conventional binders.

A preferred specific embodiment of a process of the invention is illustrated in the drawing, in which there is shown a flow diagram.

Considering the invention in a preferred specific aspect as illustrated in the drawing it is seen that a slurry of an estersil in butanol is a suitable starting mixture for use according to the invention. The estersils will be described in detail hereinafter. In general terms, a preferred type of estersil is described as consisting of a substrate of supercolloidal aggregates of porous, amorphous silica having a surface area of at least 25 square meters per gram, the silica substrate being coated with ester groups.

The fluid estersil slurry in butanol is pumped through a heat controller in which the heat is adjusted so that the enthalpy change will correspond under the conditions of the process to that required to produce a product containing the desired amount of residual butanol. The estersil slurry is under pressure in the heat controller and as it leaves the controller it is passed through a pressure-reducing valve. The pressure is reduced and thereby the excess of butanol over that required to fill the pores in the estersil is for the most part volatilized.

The mixture of butanol vapor and estersil containing butanol is passed to a cyclone separator and the butanol vapor is removed. The estersil, which contains butanol enough to fill its pores, is then run into a pellet mill or other suitable device for compacting it to make formed bodies. The pellets are then dried to leave only a trace of butanol.

While the invention has been described above and is shown in the drawing in connection with particular equipment and as applied to a specific type of porous solid, a variety of other materials can be treated and various types of equipment and various process conditions can be used without departing from the spirit of the invention.

Considering the individual process steps in somewhat greater detail but without specific reference to the particular materials treated, it is first noted that the slurry of a particulate porous solid in an organic liquid can vary widely in composition. It is only necessary for purposes of the invention that there be enough of the organic liquid present to make the mixture a fluid slurry. The amount of organic liquid required can readily be judged visually, and it is usually of the order of about 10 pounds for each pound of solid. Depending upon the porosity of the particulate solid, it will require more or less of the organic liquid.

The heat controller can be any device for raising or lowering the temperature of the fluid mixture under pressure. In a preferred commercial process the fluid mixture will ordinarily be at an elevated temperature and the heat controller is required only for adjustment of the temperature.

The upper temperature is limited only by the decomposition point of the organic liquid or of the porous solid. As a practical matter, however, it is ordinarily desired to use temperatures which do not greatly exceed the critical temperature. The temperature can be as low as desired, but it is normally well above the normal boiling point of the organic liquid.

The pressures normally used will be those that correspond to the vapor pressure of the organic liquid at the temperature selected. Higher pressures can be employed, however.

The pressure reducing valve can be a valve of conventional design suitable for throttling applications and which will permit continuous flow of a slurry to an area of lower pressure. Alternatively, the pressure reduction can be effected by the use of a rupture-disc, an orifice, or any other means for effecting a gradual or rapid reduction of pressure.

In the drawing the pressure reducing valve is shown as feeding into a cyclone separator which will be at substantially atmospheric pressure. It will be evident, however, that the pressure on the down-side of the pressure reducing valve can be lower or even higher than atmospheric. The use of pressures greater than atmospheric would find application primarily in connection with liquids that are volatile at normal temperatures, while the use of pressures lower than atmospheric would ordinarily be justified only with organic liquids which are relatively high-boiling.

The particulate, porous solid separated from the volatilized organic liquid must contain a considerable amount of the organic liquid. This is the crux of the invention. However, the organic liquid preferably is not present in an amount such that the particulate, porous solid appears wet; in other words, the solid preferably is an apparently dry and free-flowing powder. If the particulate porous solid does not contain enough of the organic liquid, products of the desired density cannot be produced; on the other hand, it is not imperative that the amount of organic liquid be precisely the maximum which can be present without the product appearing wet. Somewhat smaller amounts can be present. There may be as little as, say 20 percent of this maximum; there cannot, however, be any excess over this maximum unless means are provided for its subsequent evaporation.

While the production of an apparently dry, free-flowing product from the controlled flashing step represents a preferred embodiment for a number of reasons including ease of handling, it is not absolutely necessary that the product produced be apparently dry and free-flowing. No benefits accrue from leaving more liquid in the solid than is required to fill the pores. More liquid can be left, but there is no advantage as far as densification is concerned and just that much more liquid must subsequently be volatilized.

The material as obtained from the cyclone separator has a much higher bulk density than a product which is obtained, for example, by flash drying the porous solid and removing all of the organic liquid either above or below the critical temperature.

The product as thus produced is, in one aspect of the invention, compacted and formed into novel shaped bodies as by pelleting, granulating, or tableting. Any similar means for shaping formed bodies may be used and it will be noticed that the processes do not require the use of binders as in the usual practices.

By the processes just described, an overall densification up to about one-half of the absolute density of the product can be effected.

After the products have been formed any organic liquid remaining may then be removed by drying. Ordinarily a trace of the organic liquid will remain after drying and this may amount to as much as, say, 1 percent or even more, by weight of the porous solid.

The products prepared as just described are novel and highly useful, in that they are in a form which eliminates all the hazards and other disadvantages of a light, fluffy, dust material, while retaining the advantage of easy dispersibility in liquid and plastic systems.

As has been noted above it is critical to have the correct amount of residual organic liquid remain in the particulate, porous solid after the main body of the organic liquid is removed. The amount is controlled in processes of the invention by a proper selection of the temperatures and pressures and of the ratio of organic liquid to porous solid. If the enthalpy is too high prior to reduction of pressure there will not be enough of the organic liquid remaining to yield a product as above described. If the enthalpy is too low there will be too much of the organic liquid remaining. One skilled in the art can readily select a ratio of organic liquid to porous solid, a temperature change and a pressure drop which will leave the required amount of organic liquid. Such selection can be by reference to well-known thermodynamic methods, or if preferred, by empirical methods.

The initial and final conditions of temperature and pressure preferably are so selected that the enthalpy change is sufficient to vaporize enough of the liquid that the product formed contains a volume of liquid approximately equal to the pore volume of the dry product at the compacting pressure. By "approximately equal to the pore volume" is mean an amount of liquid equal to from about one-half of the pore volume to the pore volume. It will be noted that the pore volume varies with the compacting pressure. When the product from the controlled flashing operation is subjected to a subsequent pelletizing step, the compacting pressure will be the pressure employed in the pelletizing step. When the pelletizing step is omitted, the compacting pressure will be the final pressure condition of the controlled flashing operation, e. g., atmospheric pressure. Pore volume of porous materials as a function of the pressure may be determined by a method as described by H. L. Ritter and L. C. Drake in Ind. Eng. Chem., Anal. Ed., 17, 782–790 (1945). This method involves measuring the total porosity using helium and then determining by a mercury penetration method the pore volume occupied by mercury at the given pressure. The pore volume at this pressure is the volume unaccessible to mercury but accessible to helium, or in other words, the difference between the pore volume by helium and the pore volume by mercury penetration at the particular pressure. In the case of atmospheric pressure compaction, i. e., no pelletization, pore volumes may be determined by the well known nitrogen method as described by Holmes and and Emmett in Journal of Physical and Colloid Chemistry, 51, 1262 (1927). For any particular liquid and in an ideal case, the pore volume can be determined using that particular liquid employing the well known absorption isotherm technique. At any given temperature the vapor pressure is determined as a function of the particular liquid content of the adsorbent. As more and more liquid is adsorbed, the vapor pressure rises until sufficient liquid is adsorbed that the vapor pressure corresponds to the vapor pressure of the pure liquid at that temperature. The volume of liquid adsorbed at this point is the pore volume available to that liquid at the particular temperature and pressure employed.

The desired result of densification is largely lost if there is left less than about one-half of the liquid that would be required to completely fill the pores at the particular compacting pressure.

While any organic liquid boiling below about 200° C. can be used, it will obviously be most desirable to use inexpensive compounds which are liquid at normal temperatures, non-toxic, non-corrosive, and compatible with the particular porous solid selected. Thus, with any of the porous solids which are treated according to the invention there can be used as the organic liquid a hydrocarbon such as benzene, octane, xylene, or petroleum fractions in a selected boiling range. Again, there can be used an aliphatic primary or secondary alcohol such as methanol, ethanol, propanol, butanol, isopropanol, hexanol, methyl isobutyl carbinol, or in short any of the primary or secondary alcohols which boil below 200° C. Ketones such as acetone and methyl ethyl ketone can also be used.

It will be understood that in the preparation of some of the particulate, porous solids to be densified according to the present invention the solids will have been treated at an earlier stage in their preparation with a specific organic liquid. For example, they may have been azeotropically dehydrated with butanol and subsequently esterified to form a butyl ester coating. In such an event the organic liquid which is used to produce a dense product according to the present invention will advantageously be that which is already present. It will be removed according to processes of the invention without the introduction of still other organic liquids.

The particulate solid in the original fluid mixture should be porous. The pores need not be of any particular shape or depth and can consist principally of surface irregularities on the particles. In a preferred embodiment, however, the solid will consist of aggregates of coherent, ultimate, non-porous spherical units, the pores being the voids in the aggregates between the spheres. The aggregates can have an average pore diameter of at least 4 millimicrons and a specific surface area of at least 25 square meters per gram. The aggregates are preferably made up of spherical units of amorphous silica having an average diameter in the range of 5 to 100 millimicrons. These silica spheres are joined together into reinforced, reticulated structures which are the aggregates. Such aggregates will have a specific surface area of from about 200 to 600 square meters per gram and a coalescence factor of 0.9 to 1.3.

The present invention has particular applicability to siliceous materials having a general structure of the type described as substrates in United States application Serial No. 315,930, filed October 21, 1952, by Ralph K. Iler and issued October 27, 1953, as United States Patent 2,657,149, especially when such materials have been surface-esterified to give the structure therein called "estersils."

The invention will be better understood by reference to the following examples in addition to those already given.

*Example 1*

A butanol slurry of coherent aggregates of amorphous silica surface-esterified with n-butanol was prepared according to Example 5 of the above-mentioned Iler Patent 2,657,149, by pumping a butanol slurry of coherent aggregates of amorphous silica containing 8 percent by weight of the solid silica on a dry basis, at a rate of 2.8 gallons per hour, through an autoclave maintained at 1500 pounds per square inch pressure and 320° C. The slurry of the esterified product was then passed into a heat controller and the temperature of the slurry was adjusted to 200±3° C. while maintaining the pressure at about 1500 p. s. i. g.

From the heat controller the slurry was passed to a pressure reducing valve and the butanol was allowed to expand rapidly through a cyclone separator. The solid product passed into a receiver maintained at a reduced pressure corresponding to 6 inches of mercury, absolute. The product at this point was apparently dry, being in a free-flowing form and containing no visible liquid. It was readily removed from the receiver by discharge through a 2" gate valve.

The product from this receiver showed a loss upon drying of 0.73 pound of butanol per pound of dry solid and had a bulk density of 0.193 gram per cc. The surface area of this product was 293 square meters per gram. It contained 7.1 percent carbon in the form of chemically bound n-butoxy groups after drying under conditions which removed free butanol.

The product from the cyclone separator was suitable for pelletization in a conventional pelletizing machine.

*Example 2*

A silica slurry composed of 8.3 percent silica, 0.05 percent water, and the remainder normal butanol (all percentages being on a weight basis) was pumped at a rate of 42 pounds per hour to a heating chamber under a pressure of 1400 p. s. i. g. at a temperature of 320° C. to produce an esterified product. This mixture was cooled to 200° C. by passing through a heat exchanger and was discharged at this temperature through a pressure reducing valve to a zone of lower pressure (23 inches Hg vacuum or about 3.4 p. s. i. a.). The resulting mixture of finely divided butyl-esterified silica powder and butanol vapor was passed through a cyclone type of separator where about 85 percent of the butanol was withdrawn through the vapor outlet at the top. The other 15 percent of the butanol was adsorbed on the butyl-esterified silica powder and was withdrawn with the powder at the bottom of the cyclone.

The esterified silica containing the entrained butanol was analyzed for butanol content by loss of weight on drying and found to contain 60.9 percent butanol or 1.55 pounds butanol/lb. esterified silica.

To reduce the dustiness of the butyl estersil, the above esterified butanol mixture was forced through the die of a screw extruder containing holes about 1/16" diameter by 1/4" long. This operation caused the estersil to be compacted and wholly wetted by the butanol, and translucent spaghetti-like pellets of estersil-butanol mixture were formed.

These translucent bodies were heated to about 110° C. to remove the free butanol and then characterized for quality. The results follow:

*Grease test.*—The grease was prepared by mixing the pelleted estersil with a mid-continent solvent treated petroleum oil (viscosity 300 SUS at 100° F. Viscosity index=100) in an oil-estersil weight ratio of 6.5 to 1. The mix was passed through a Kent three-roll ink mill with the rolls set for clearance of 0.0015 inch. After seven passes through the mill, the grease was clear and buttery and had a micropenetration value of 88 at 77° F. as measured by the ASTM micropenetration method (ASTM Standards on Petroleum Products and Lubricants, November 1949, page 1309).

*Silicone test.*—A silicone rubber vulcanizate was prepared from the pelleted estersil in the above example, utilizing a dimethyl silicone elastomer commercially available from the General Electric Company as "SE 75 Silicone Elastomer." The particular batch used was found to have an intrinsic viscosity of 0.87 measured in benzene. The elastomer (one hundred volumes) was placed on an open mill and the dried pelleted estersil (25 volumes) was thoroughly incorporated into the elastomer. The resulting stock was molded using a Carver press while heating until the temperature in the mold reached 230° F. and was then held at this temperature for 15 minutes. The mold was cooled to 100° F. and opened. The rubber was removed and heated in an air circulating oven for about 24 hours at 400° F. The resulting product was found to have an ultimate tensile strength of 1095 p. s. i. g. and an ultimate elongation of 555 percent. It was a clear, snappy stock with no particles of the filler visible.

*Dusting tendency test.*—The Roller analyzer, normally used for particle size analysis by air elutriation (Roller, U. S. Bureau of Mines, Technical Publication, 490, 1931), is employed in this dusting tendency test. A weighed amount of pelleted estersil (about 20 ml.), from which all particles less than 50 mesh (U. S. Standard Sieve Series) were removed by sieving, is introduced into the U-tube of the Roller analyzer. Using a cyclone separating chamber 1⅛ inches diameter and an air throughput rate of 11.6 liters per minute at room temperature and constant humidity achieved by bubbling the air through 50 percent sulfuric acid, particles less than 80 microns are swept out of the pelleted estersil as the U-tube containing the sample is agitated by a knocker arm. The particles less than 80 microns are collected in an air filter and weighed at several time intervals. The weight percentage of the particles less than 80 microns is plotted against time, and the slope of the line is the measure of dusting tendency which in this example is 0.07 percent per minute.

*Bulk density.*—0.34 g./ml. loosely packed.

*Free butanol.*—1.05 percent as measured by loss on drying in oven at 115° C. 10 mm. Hg absolute pressure, for 16 hours.

*Surface area.*—295 m.²/g. as measured by nitrogen adsorption (ASTM Symposium on New Methods for Particle Size Determination in the Sub-Sieve Range, March 4, 1941, pp. 95–105).

*Carbon content.*—7.66 percent by chemical analysis.

*pH.*—8.50 in equal parts by weight of methanol and water.

We claim:

1. In a process for effecting controlled densification of a particulate, porous solid having an amorphous silica internal structure and a specific surface area of at least 200 square meters per gram, the steps comprising making a fluid mixture of the solid and an organic liquid having a boiling point below 200° C. selected from the class consisting of primary and secondary alcohols, hydrocarbons, and ketones, heating the mixture under pressure to a temperature above the boiling point of the organic liquid, reducing the pressure and vaporizing off organic liquid until the amount remaining is about from 20% of the maximum amount which can be present in the porous solid in an apparently dry, free-flowing powder form to the amount required to fill the pores of the solid, and mechanically compacting the solid containing the residual liquid.

2. In a process for effecting controlled densification of a particulate, porous solid having an amorphous silica internal structure and a specific surface area of at least 200 square meters per gram, the steps comprising making a fluid mixture of the solid and an organic liquid having a boiling point below 200° C. selected from the class consisting of primary and secondary alcohols, hydrocarbons, and ketones, heating the mixture under pressure to a temperature above the boiling point of the organic liquid, reducing the pressure and vaporizing off organic liquid until the amount remaining is about from 20% of the maximum amount which can be present in the porous solid in an apparently dry, free-flowing powder form to the amount required to fill the pores of the solid, mechanically compacting the solid containing residual liquid and shaping it into a formed body, and thereafter removing the residual liquid.

3. A process of claim 1 in which the particulate, porous solid is organophilic and has an exterior coating of organic groups combined with an interior silica structure.

4. A process of claim 1 in which the particulate, porous solid consists of a supercolloidal substrate of amorphous silica coated with —OR groups, the substrate being in the form of aggregates of coherent, ultimate, non-porous units of average diameter in the range of 5 to 100 millimicrons, the aggregates having an average pore diameter of at least 4 millimicrons, and there being in the —OR group coating, chemically bound to said silica, at least 200 —OR groups per 100 square millimicrons of substrate surface area, R being a hydrocarbon radical of from 2 to 18 carbon atoms wherein the carbon attached to oxygen is also attached to hydrogen.

5. A process of claim 1 in which the particulate, porous solid consists of a supercolloidal substrate of amorphous silica coated with alkoxy groups, the substrate having an average pore diameter of at least 4 millimicrons and a specific surface area of at least 200 square meters per gram, and the alkyl radical of the alkoxy group in the coating being a hydrocarbon radical of from 2 to 18 carbon atoms wherein the carbon attached to oxygen is also attached to hydrogen.

6. A process of claim 1 in which the particulate, porous solid consists of a supercolloidal substrate of amorphous silica coated with n-butoxy groups, the substrate being in the form of aggregates of coherent, non-porous, spherical ultimate units, the aggregates having an average pore diameter of at least 4 millimicrons, a specific surface area of about from 200 to 600 square meters per gram, and there being in the n-butoxy coating, chemically bound to said silica, at least 270 n-butoxy groups per 100 square millimicrons of substrate surface area.

7. The product of a process consisting of making a fluid mixture of normal butanol and a particulate, porous solid, said solid consisting of a supercolloidal substrate of amorphous silica coated with n-butoxy groups, the substrate being in the form of aggregates of coherent, non-porous, spherical ultimate units, the aggregates having an average pore diameter of at least 4 millimicrons, a specific surface area of about from 200 to 600 square meters per gram, and there being in the n-butoxy coating, chemically bound to said silica, at least 270 n-butoxy groups per 100 square millimicrons of substrate surface area, heating the mixture under pressure to a temperature above the boiling point of the n-butanol, reducing the pressure and vaporizing off n-butanol until the amount remaining is about from 20% of the maximum amount which can be present in the porous solid in an apparently dry, free-flowing powder form to the amount required to fill the pores of the solid, mechanically compacting the solid containing residual n-butanol and shaping it into a formed body, and thereafter removing the residual n-butanol.

References Cited in the file of this patent

UNITED STATES PATENTS

| | | |
|---|---|---|
| 1,936,845 | Laulmann | Nov. 28, 1933 |
| 2,093,454 | Kistler | Sept. 21, 1937 |
| 2,142,984 | Thurman | Jan. 3, 1939 |
| 2,188,007 | Kistler | Jan. 23, 1940 |
| 2,221,175 | Becktold | Nov. 12, 1940 |
| 2,344,247 | Hopkins | Mar. 14, 1944 |
| 2,444,832 | Krebs | July 6, 1948 |
| 2,457,962 | Whaley | Jan. 4, 1949 |
| 2,572,857 | Hall et al. | Oct. 30, 1951 |
| 2,657,149 | Iler | Oct. 27, 1953 |